United States Patent [19]

Strauser

[11] Patent Number: 4,887,219
[45] Date of Patent: Dec. 12, 1989

[54] BOARD CUT-OFF SAW ASSEMBLY

[75] Inventor: Michael Strauser, Walla Walla, Wash.

[73] Assignee: Strauser Manufacturing, Inc., Walla Walla, Wash.

[21] Appl. No.: 151,434

[22] Filed: Feb. 2, 1988

[51] Int. Cl.[4] ..................... G05B 13/00; B27B 27/10
[52] U.S. Cl. ..................... 364/474.09; 364/474.13;
    83/71; 83/365; 83/467 A; 83/522; 83/522.11;
    83/468; 83/76.6; 144/357; 250/560
[58] Field of Search ............... 364/474.09, 474.13;
    83/71, 72, 106, 360, 365, 467 A, 468, 490, 522;
    144/357, 356, 312; 33/15; 250/560

[56] References Cited

U.S. PATENT DOCUMENTS

| | | | |
|---|---|---|---|
| 3,676,652 | 7/1972 | Millis, Jr. et al. | 364/562 |
| 3,811,353 | 5/1974 | Miles | 83/468 |
| 3,819,918 | 6/1974 | Hale | 364/562 |
| 3,931,501 | 1/1976 | Barr et al. | 364/474.09 |
| 3,992,614 | 11/1976 | Buss | 364/474.09 |
| 4,017,976 | 4/1977 | Barr | 364/474.09 |
| 4,086,496 | 4/1978 | Berry | 144/357 |
| 4,163,321 | 8/1979 | Cunningham | 364/474.13 |
| 4,195,346 | 3/1980 | Schroder | 364/474.09 |
| 4,546,440 | 10/1985 | Palmberg | 364/474.09 |
| 4,794,963 | 1/1989 | Oppeneer | 83/71 |

OTHER PUBLICATIONS

Article entitled "A Technological Breakthrough for Increasing Yield", reprinted from *Furniture Manufacturing Management Magazine*, Apr. 1982.
Product Brochure of Dimter GMBH of West Germany entitled "OPTIMAX System OKS 500" (No printing date shown).

*Primary Examiner*—John R. Lastova
*Attorney, Agent, or Firm*—Wells, St. John & Roberts

[57] ABSTRACT

A board cut-off saw apparatus 10 is described for enabling cut-off saw operator to cross cut boards along their length to obtain usable wood pieces and to remove or discard defective sections. The apparatus 10 includes a plurality of cut-off saw lines 26 with manually activated cut-off saws for cutting the boards along each line. The length of the boards and the length of the cut wood pieces are measured while the board is being cut. Each cut-off saw line has an optical measuring system extending upstream and downstream for measuring the length of the boards 12 and cut wood pieces 24, respectively. The downstream optical sensors (photo) comprise a longitudinal row of closely assembled light emitting diodes 58 for sensing the length of the wood pieces with a measurement resolution of less than ¼ of an inch. Each cut-off saw line 26 has a sorter for sorting the wood pieces according to their measured length. Each cut-off saw line 26 has a control means or cut-off saw computer 120 for controlling the cut-off saw line including the measuring system and the sorting system with a memory for storing information concerning board and wood piece lengths. A host cut-off saw computer 124 controls each of the cut-off saw computers 120 and accumulates data concerning length information and calculates and displays recovery rate and production information. Each cut-off saw line has a recommended cut indicator for physically indicating to the operator the length of recommended cuts.

20 Claims, 10 Drawing Sheets

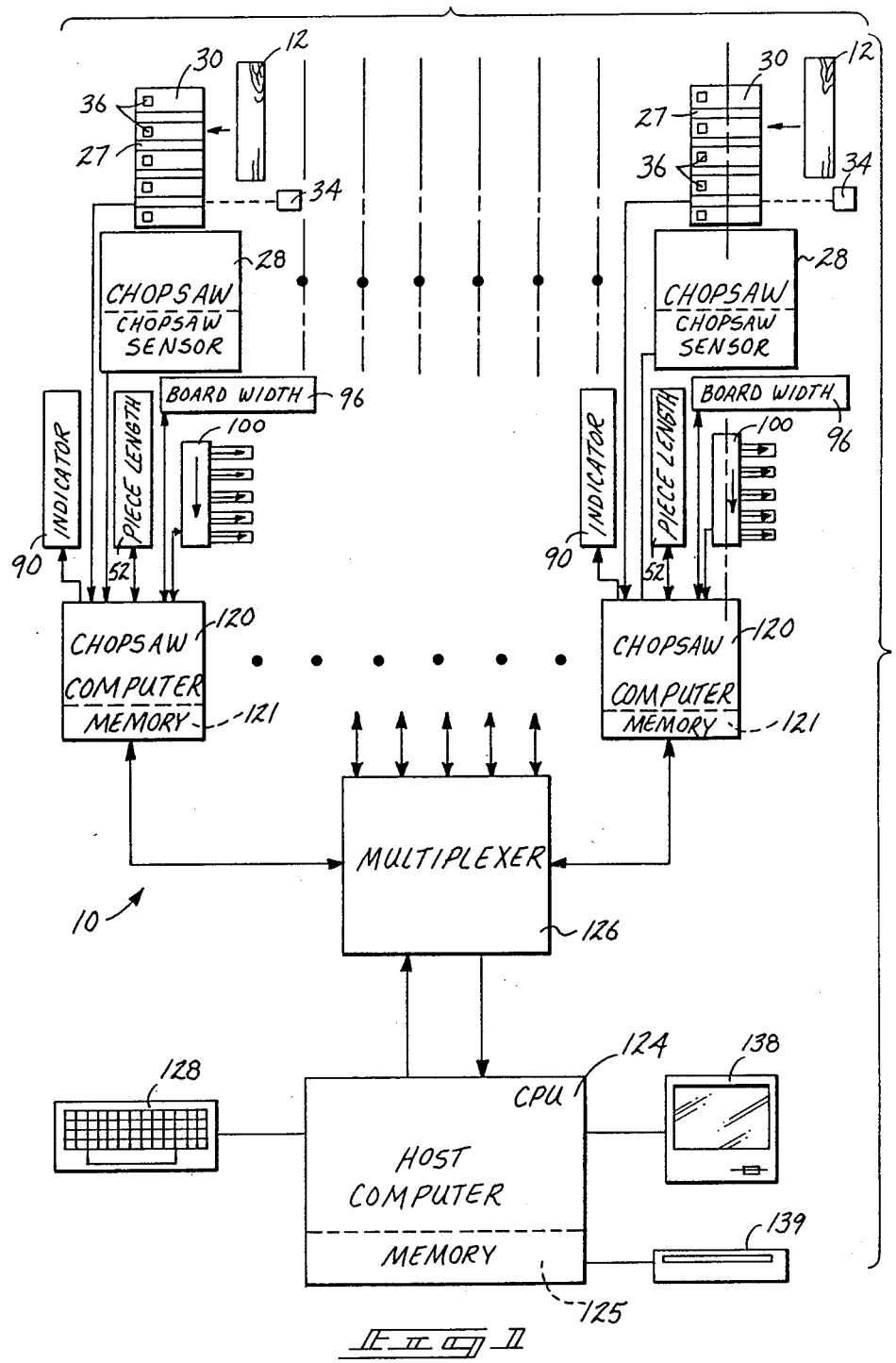

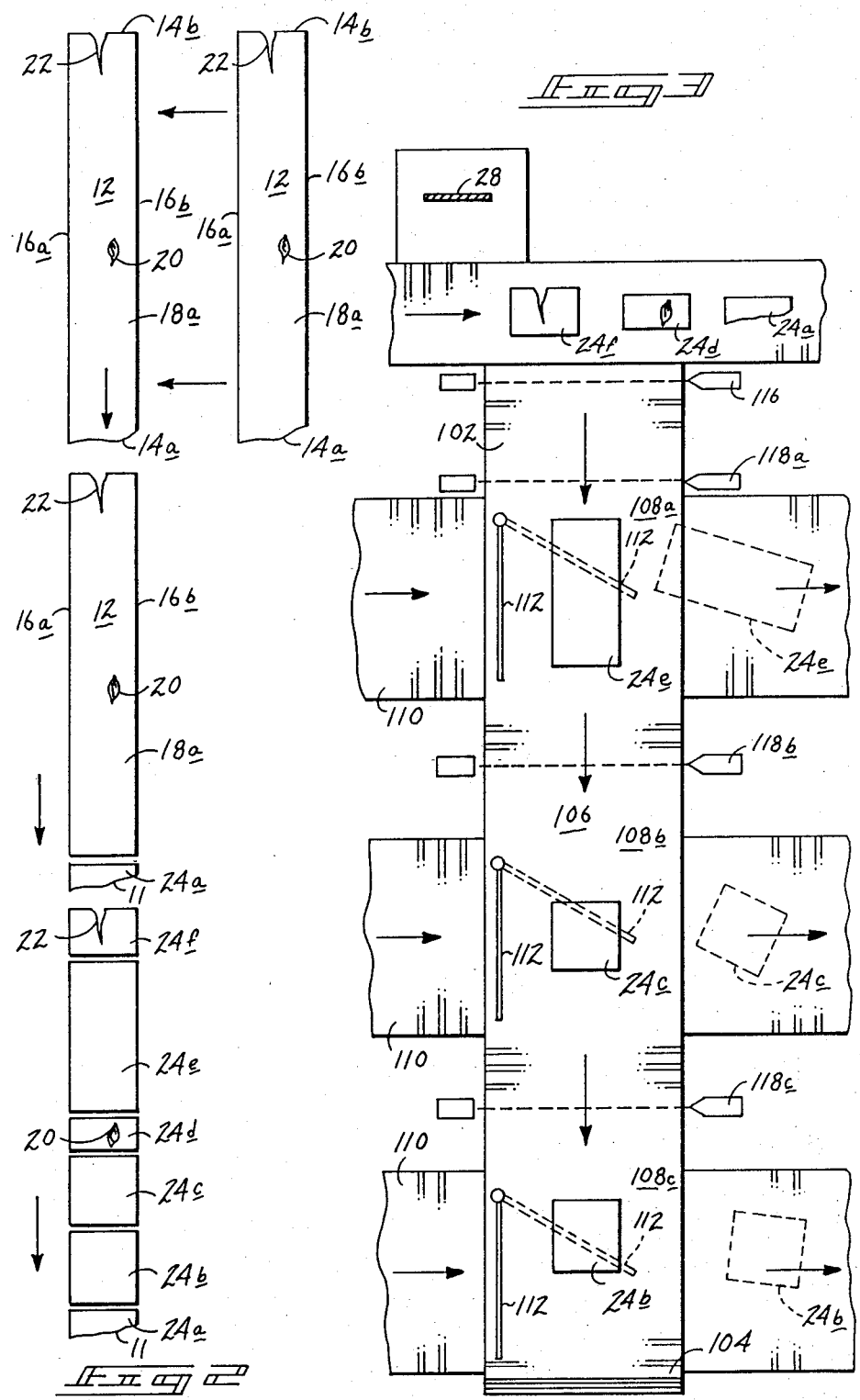

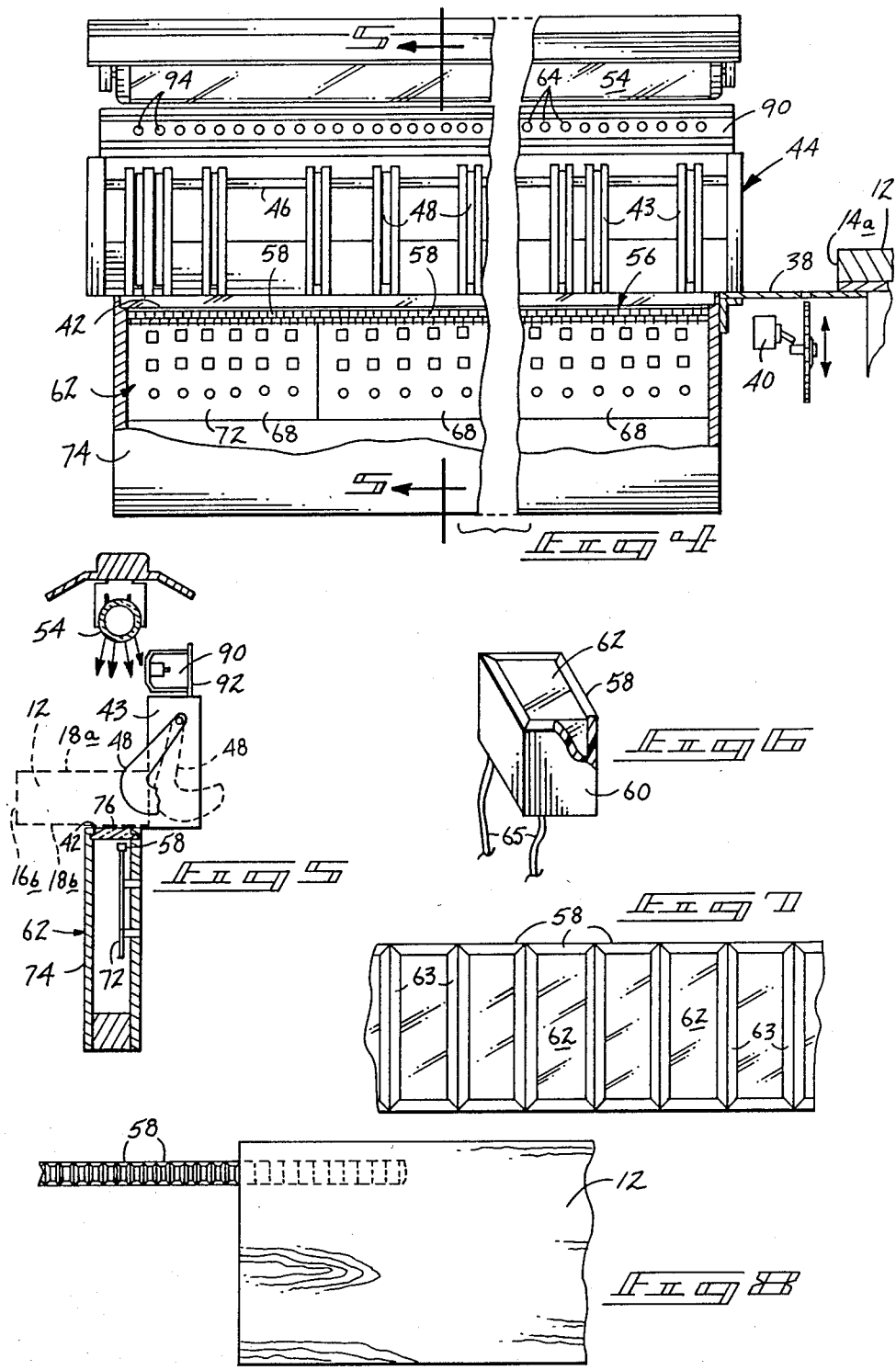

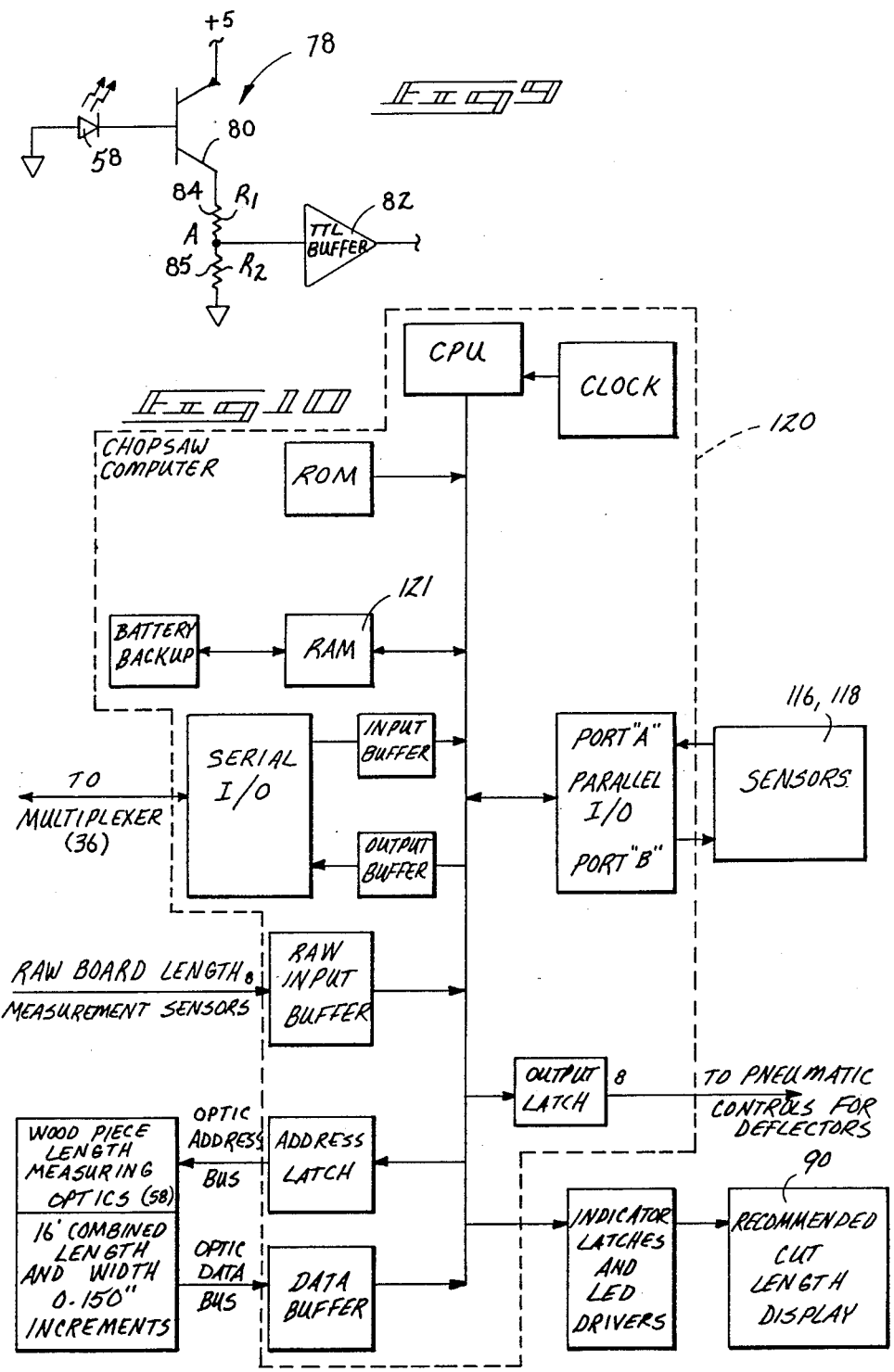

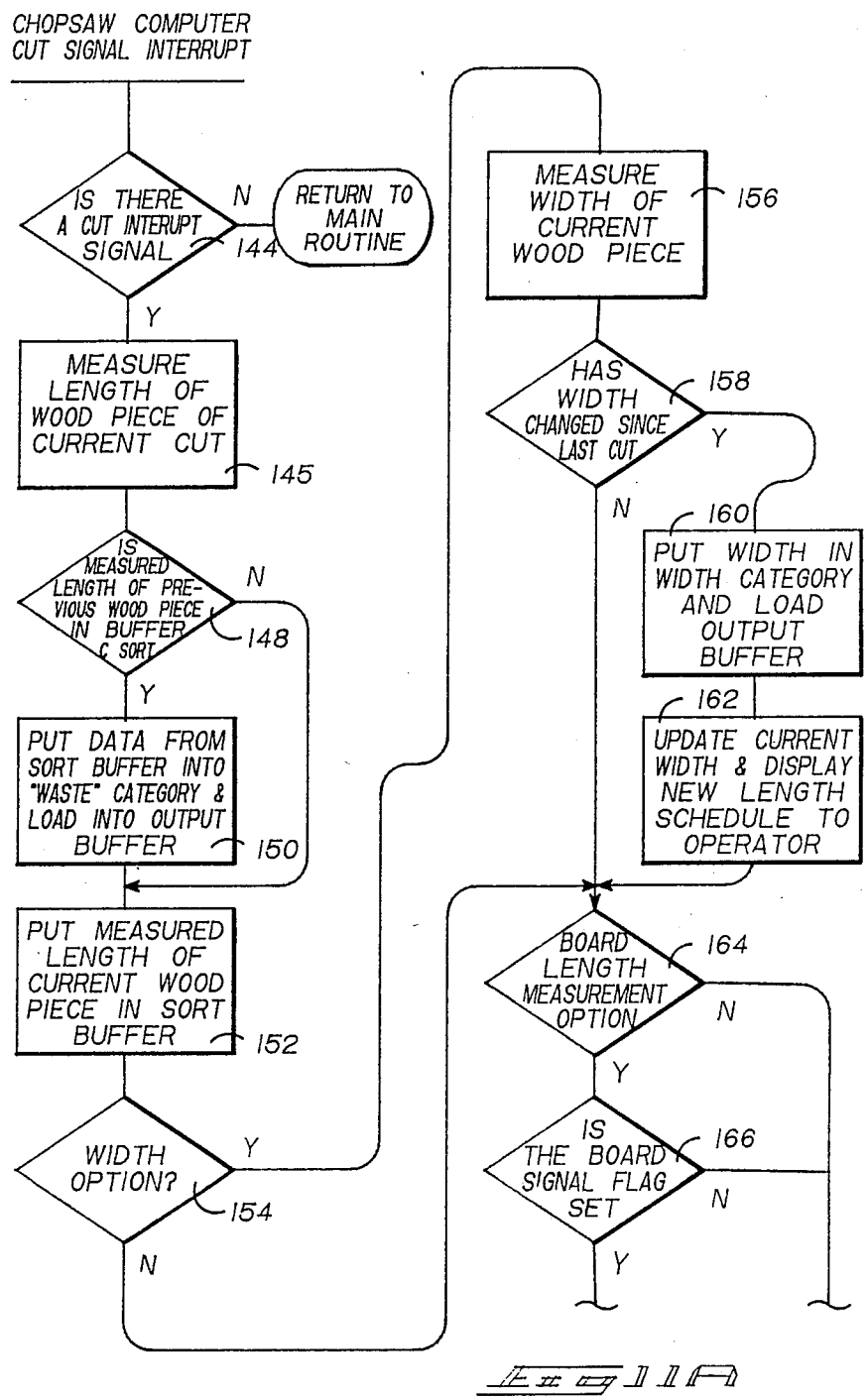

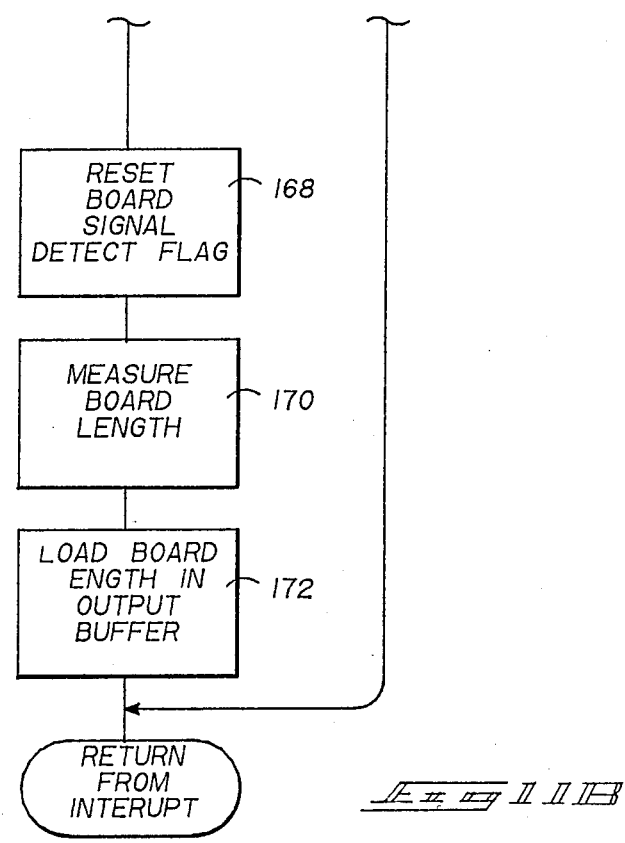

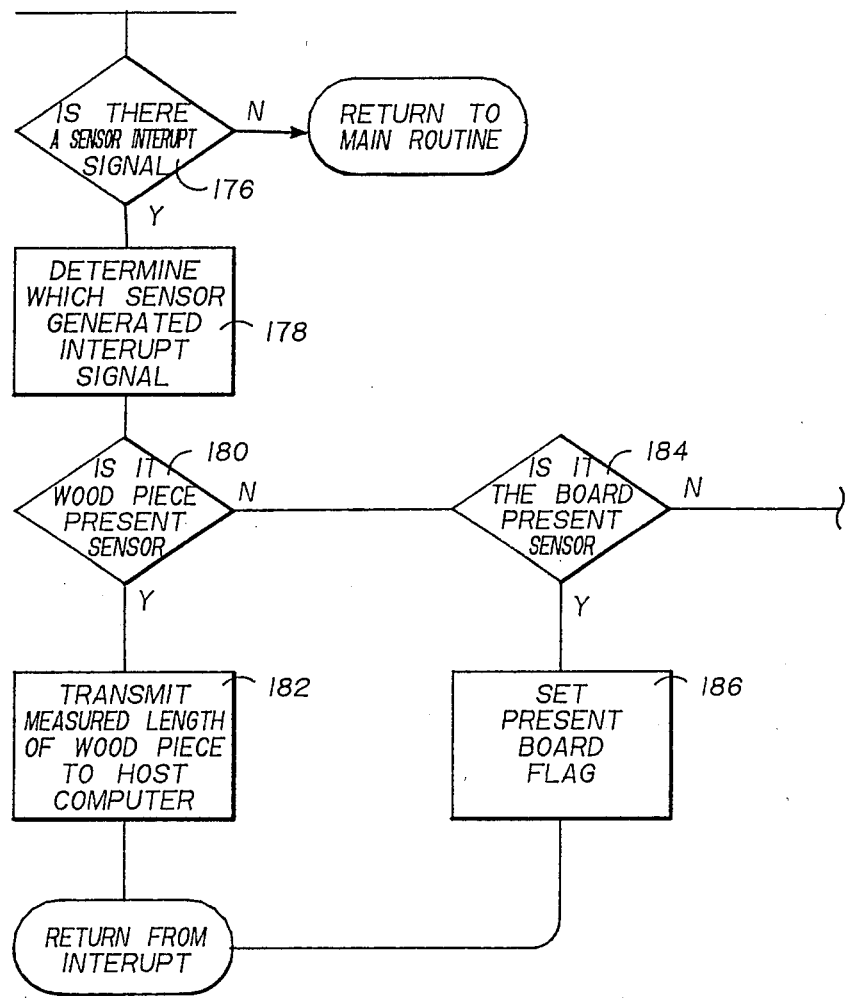

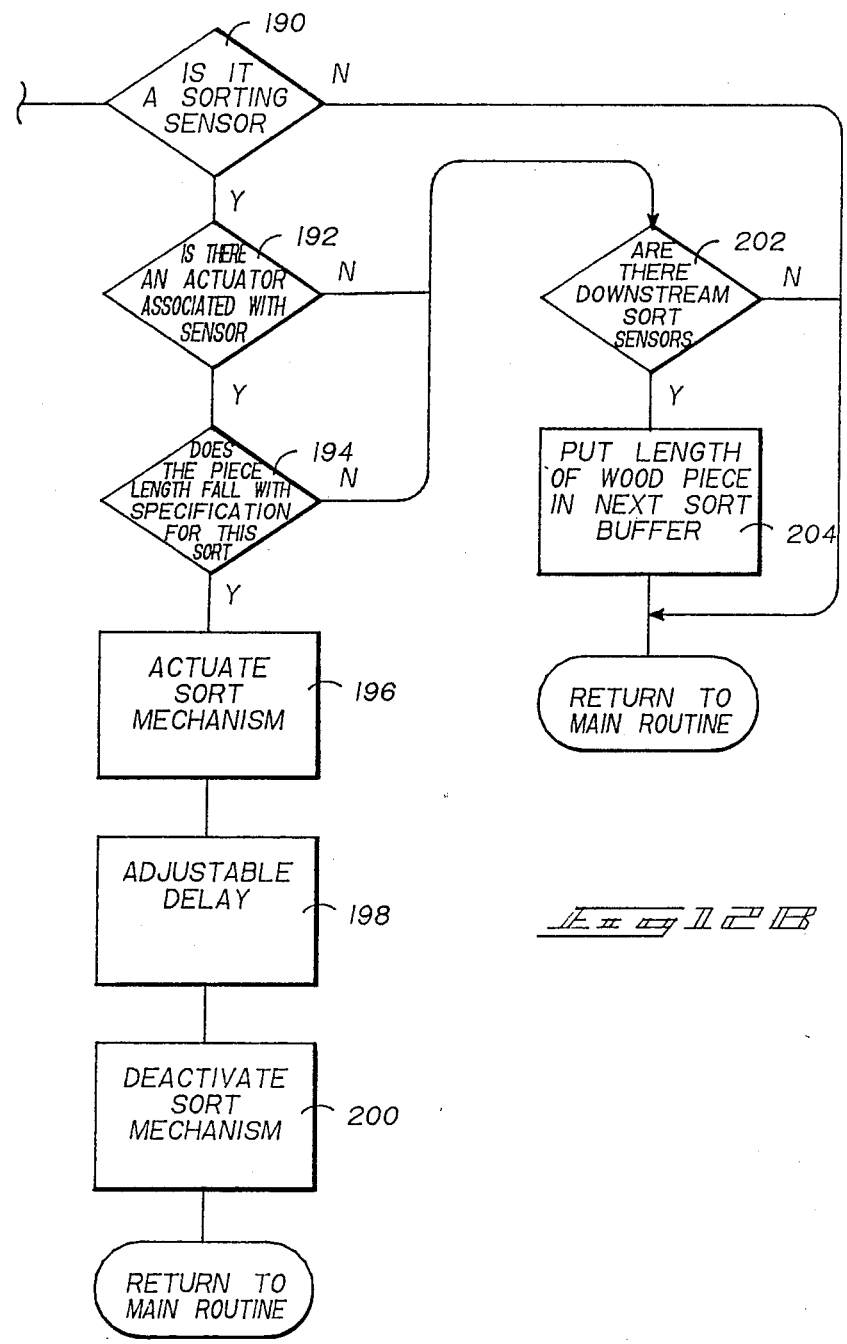

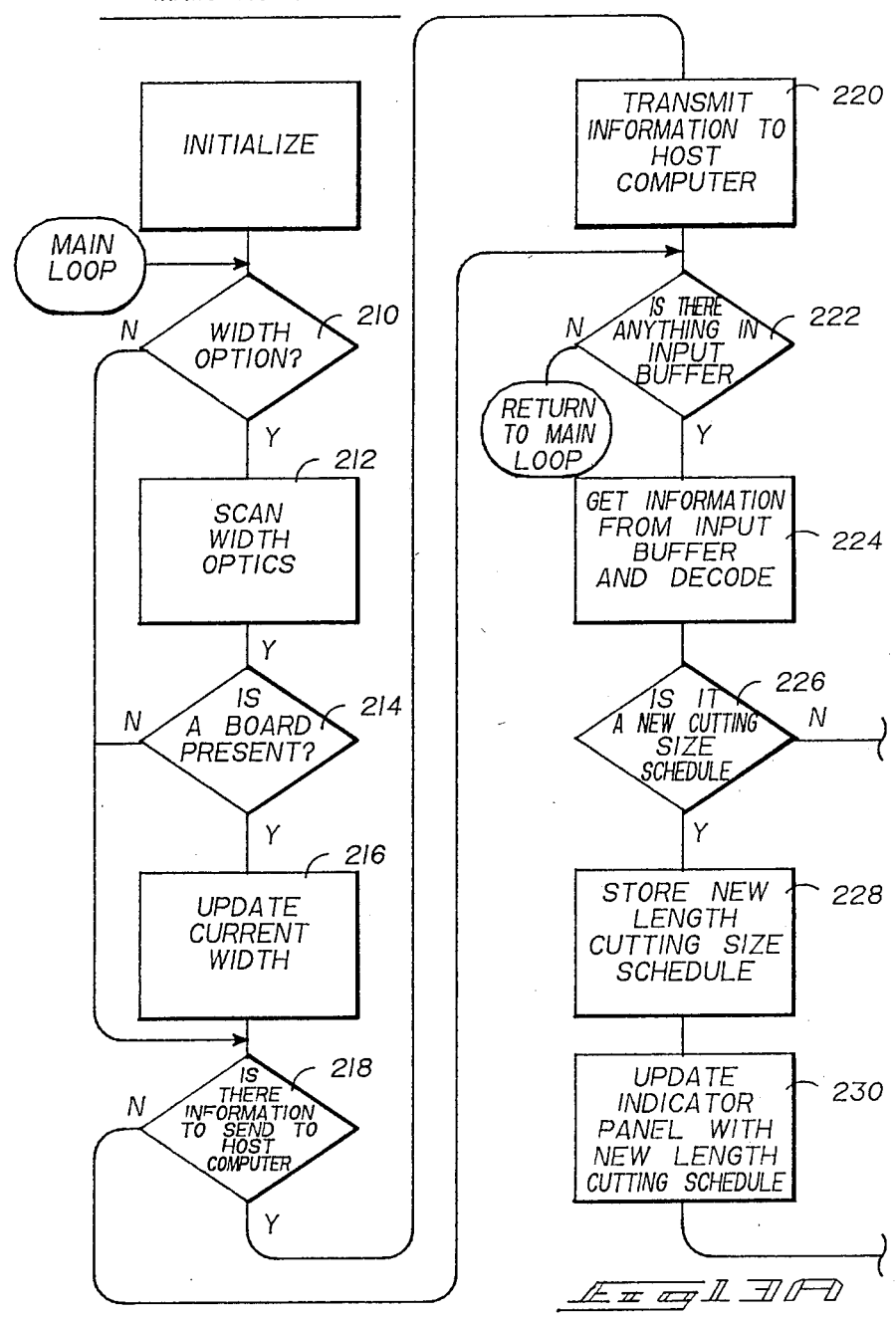

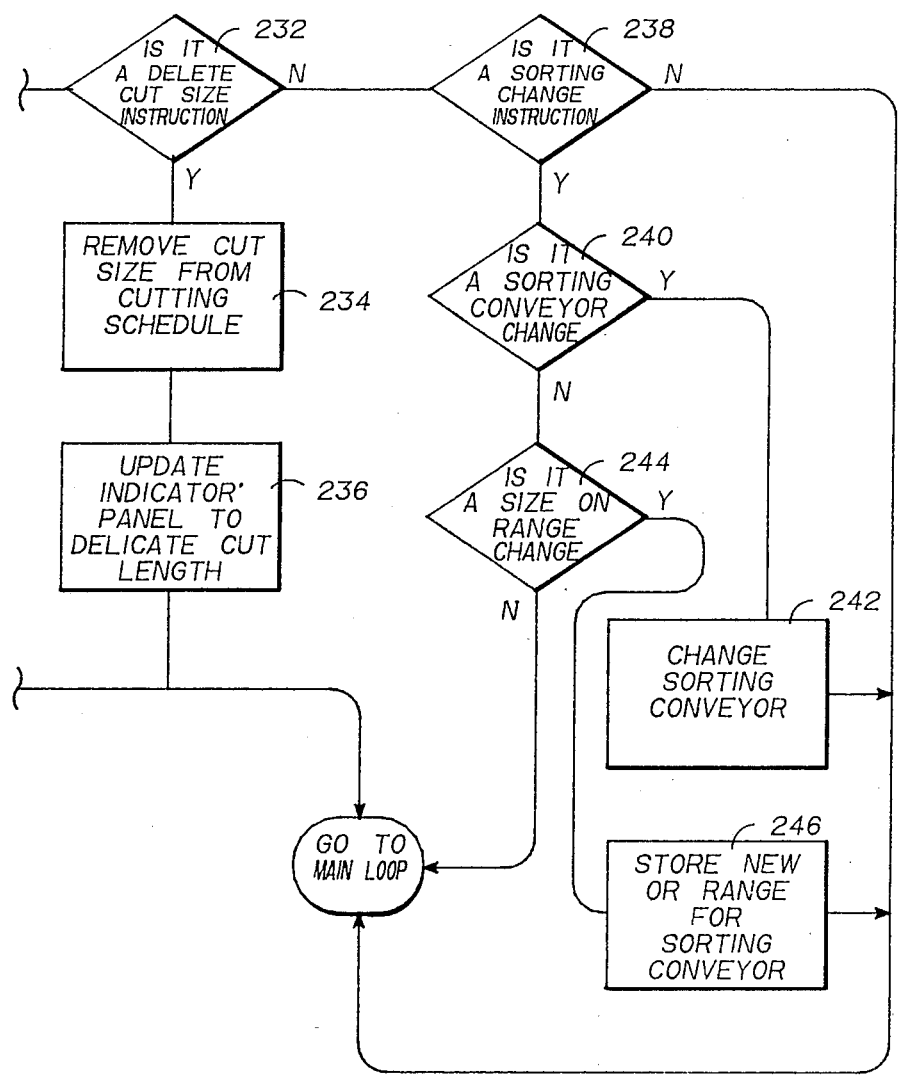

BOARD CUT-OFF SAW ASSEMBLY

TECHNICAL FIELD

This invention relates to board cutting equipment and more particularly to board cut-off saw assemblies for cutting boards by a manually operated cut-off saw or chopsaw into various length wood pieces and for removing defective sections from the board.

BACKGROUND OF THE INVENTION

Many products contain wooden parts or components made with wood pieces that have been cut from boards utilizing a manually operated cut-off saw or chopsaw. For example, case goods, clocks, upholstery frames, dimension lumber parts, desks, kitchen cabinet parts and chairs are just a small example of various products that utilize wood components and pieces in which the wood pieces have been cut from boards.

Frequently it is desirable that the wood pieces be without major defects or disfiguration and be of a desired length, width and thickness.

Systems are available that either automatically (with a laser) or manually mark on the board the location of an undesirable defect. The marked boards are fed automatically through an optical sensor that scans the location of the marks and then automatically cuts the board to remove the marked defect. An example of such a system is manufactured by Dimter GMBH of West Germany and sold under the brand name "OP-TIMAX."

It is very desirable to provide a less costly board cut-off saw assembly having a manually operated cut-off saw for cutting boards into smaller wooden pieces of desired lengths and for removing defective sections in a very efficient manner and to minimize the amount of waste material and improve the recovery rate of usable material from the boards.

One of the principal objects of this invention is to provide a less expensive board chopsaw assembly for a manually activated cut-off saw system to enable a cut-off saw operator to significantly increase his/her efficiency and to increase the recovery rate of useable material from the boards.

Additionally, it is desirable to provide a board cut-off saw assembly that is capable of monitoring a number of manually operated cut-off saw lines and to determine on a real time basis the amount of wood cut and the number of pieces that have length that fall within a certain length categories by measuring the pieces downstream of the manually operated cut-off saw.

It is a further object of this invention to provide a unique board cut-off saw assembly that is capable of keeping a running inventory of the wood pieces that have been cut and to be able to change the recommended settings for cutting the wood without having to shut down production and to change the settings and then restart the production.

These and other objects and advantages of this invention have become apparent upon the reading of the following detailed description of the preferred embodiment.

BRIEF DESCRIPTION OF THE DRAWINGS

The preferred embodiment of the invention is illustrated in the accompanying drawings, in which:

FIG. 1 is a schematic block diagram of a preferred embodiment of a board cut-off saw assembly which includes means for monitoring a plurality of manually operated cut-off saw lines;

FIG. 2 is a schematic sequential view of a board being processed through a cut-off saw illustrating the number of cuts that are made in the board and the wood pieces that are formed as the cut-off saw process is taking place;

FIG. 3 is a schematic view of a sorting system downstream of a cut-off saw for sorting the wood pieces after they have been cut by the cut-off saw;

FIG. 4 is a vertical side view of a cut-off saw station illustrating the board fence and the stops for setting the board for selected cuts and a measuring system for measuring the length of the wood pieces as they are being cut from the board;

FIG. 5 is a vertical cross-sectional view taken along line 5—5 in FIG. 4 illustrating the use of light emitting diodes for measuring the length of the wood pieces;

FIG. 6 is a fragmentary isolated view of a single light emitting diode that is utilized in conjunction with numerous diodes for measuring the length and/or width of the wood pieces;

FIG. 7 illustrates a row of the light emitting diodes for measuring the length of the wood pieces;

FIG. 8 illustrates a row of the light emitting diodes with an end of a board covering a number of the diodes for measuring the length of the board;

FIG. 9 is an electrical schematic of a light emitting diode circuit;

FIG. 10 is a block diagram of a cut-off saw computer and its innerconnections;

FIGS. 11A & B are block flow diagrams of a portion of the computer program utilized for operating the cut-off saw computer;

FIGS. 12A & B are block flow diagrams of a portion of the computer program for the cut-off saw computer; and FIGS. 13A & B are block flow diagrams illustrating a main routine for the cut-off saw computer.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

A cut-off saw assembly generally designated with the numeral 10 is illustrated in block diagram form in FIG. 1. The board cut-off saw assembly 10 handles a plurality of elongated wooden boards 12 that extend between board ends 14a and 14b as illustrated in FIG. 2. The boards 12 each have sides 16a and 16b and face surfaces 18a and 18b. For purposes of illustration only, board 12 has a defect 20 in the form of a knot intermediate the ends 14a and 14b. It also has a second defect 22 in the form of a crack in the end 14b.

Each board 12 is subdivided into a plurality of wood pieces of desired lengths by a crosscut or cutoff saw. For purposes of illustration, the wood pieces are identified as 24a-f. Wood piece 24a is the initial trim piece at the end 14a for squaring up the end. The initial trim piece 24a is generally classified as "waste." The next two wood pieces 24b and 24c are intentionally cut pieces of usable wood that are further processed by a sorting system as illustrated in FIG. 2. The wood pieces 24d contains the defect 20 and is categorized as a "waste" wood piece. The next cut piece 20e is considered to be a usable piece of wood and it, in turn, is processed by a sorting system. The tail end cut wood piece 24f is normally classified as "waste." Consequently, of the entire board 12, wood pieces 24b, 24c, and 24e are considered to be acceptable and recovered wood pieces whereas pieces 24a, 24d and 24f are waste pieces.

In determining the recovery rate, waste piece 24a is generally not considered in the calculation. Frequently the board is measured from the first trim cut to the trailing end 24f. Thus the recovery rate normally includes the sum of the lengths of the pieces 24b, 24c and 24e divided by the total distance from the forward end of the piece 24b to the trailing end of piece 24f.

As a general rule, a cut-off saw operator is instructed to cut the longest sections from the board to obtain the maximum recovery rate. However, this general rule is frequently modified with respect to the length of pieces needed for a particular order or recommended cutting schedule. For example, board 10 has two smaller cuts 24b and 24c instead of one larger cut.

One of the purposes of the board cut-off saw assembly 10 is to not only enable the cut-off saw operator to cut the boards as indicated but to measure the cut boards and to monitor the size of the boards being cut with respect to a recommended cutting schedule. A second purpose is to evaluate the performance of a cut-off saw operator to obtain the maximum recovery possible in view of the recommended cutting schedule. This is particularly important in evaluating the performance of a number of operators operating different cut-off saw lines. A third reason to monitor different size cuts is to determine the quality of the raw lumber being used. Although any one of these factors may not be controlling, a review and analysis of all of the information is helpful in operating the plant at maximum efficiency, and in evaluating board suppliers and mills and to efficiently train operators.

The board cut-off saw assembly 10 preferably has a plurality of manually operated cut-off saw lines 26 in which the boards progress lengthwise along board paths from an infeed station 27 past a cut-off saw operator station 28. As illustrated in FIG. 1, there are eight cut-off saw operator stations 28 that are operated in parallel with each other in which one feed conveyor feeds the boards 12 to the infeed stations 27 of each line 26. Each cut-off saw line 26 has a saw feed conveyor or support 30 usually comprised of a set of rollers. A board present sensor 34 is positioned at the infeed station 27 to sense when a board is placed on the board conveyor 30. The board present sensor 34 sends a signal to the control system that a new board is present for cutting. Some systems may utilize an automatic system for removing boards selectively from a general board feed conveyor and place the boards one at a time on the board support 30. In other systems the cut-off saw operator may lift the board from the general board feed conveyor onto the board support 30 to generate the "new board" signal.

Additionally, the board cut-off saw assembly 10 includes a plurality of board length sensors 36 that are spaced along the board support 30 upstream of the cut-off saw 28 for sensing the length of the board 12. The board length sensors 36 can be spaced at various intervals depending upon the length resolution desired in the measurement. For many applications, the board length sensors 36 are spaced at two feet intervals to determine whether or not the board is a 6, 8, 10, 12, 14 or 16 foot board. A board 15 feet in actual length would be considered to be a 14 foot board as far as the supplier and purchaser are concerned. As previously mentioned, the length of board is generally determined while the trim piece 24a is being cut from the forward end 14a.

The board support 30 directs the forward end 14a of the board 12 onto a cut-off saw table 38 at the operator station as illustrated in FIG. 4. Each of the cut-off saws 28 includes a cutting blade that is movable into and out of the path of the board 12 by activation by the operator for cutting the board across the grain of the board. The operator may physically move the saw across the board or may activate a switch to cause the saw to cut the board. In either situation the cut-off saw is manually operated by the cut-off saw operator. The cut-off saw 28 has a cut-off saw switch or cut sensor 40 that senses when the saw 28 has completed cutting a board and generates a wood piece "cut" signal.

The cut-off saw operator views the board and decides where the cuts are to be made. The operator moves the board along the path placing the board in the proper longitudinal position to make the selected cut.

The portion of the board 12 that extends downstream is supported on a downstream support surface or ledge 42 and bears against a board fence 43. The board fence 43 is incorporated in a stop assembly 44 that includes a stop bar 46 that extends longitudinally alongside the path of the board for supporting a plurality of length stops 48 at selected distances from the saw blades. The stops 48 are biased outward into the path of the boards for stopping longitudinal movement of the boards and for defining preset distances between the cut-off saw and the stops defining the length of the wood pieces as they are being cut. The stops may come in various configurations. In FIG. 5, a stop 48 is illustrated as a gravity operated stop that is biased outward into the path. When the operator places a board up against the fence, the board moves the stops 48 that are engaged by the board inward out of the way of the board with the end of the board engaging the first undeflected stop.

One of the important systems of the board cut-off saw assembly 10 is a wood piece measurement means 52 that includes an optical system for measuring the length of the wood pieces as they are being cut by the cut-off saw. The wood piece measurement means 52 has an illuminating source or light 54 for directing radiation toward a plurality of photosensors 56. The wood piece being cut covers a number of the photosensors 56 while leaving others uncovered delineating the length of the board. The photosensors are mounted in a longitudinal row that extend along the length of the stop bar 46. In one embodiment the photosensors 56 are capable of accurately measuring wood pieces up to 16 feet in length.

In a preferred embodiment the photosensors 56 are composed of light emitting diodes 58 that are mounted adjacent to each other forming a row for providing a measuring resolution of less than a quarter of an inch and preferably 0.150 in resolution. Each of the light emitting diodes 58, as illustrated in FIG. 6-8, includes a rectangular case or housing 60 with a light gathering lens 62 encircled by a bezel 63. Each of the light emitting diodes 58 have electrical leads 65 for connecting the light emitting diodes to corresponding sensor circuits. As illustrated in FIG. 7, the light emitting diodes 58 are mounted adjacent to each other to form a longitudinal row.

The light emitting diodes 58 are preferably mounted on the edge of a printed circuit board 68 as illustrated in FIGS. 4 and 5. The printed circuit board 68 includes a face 72 to which electrical components such as solid state transistors and resistors are mounted. Printed circuit board 68 is mounted in a case 74 that is preferably beneath the path of the board.

The case 74 has a transparent window 76 that serves as a part of the support surface or ledge 42 for supporting the board.

In this particular embodiment, the light source 54 is mounted above the path of the board with the photosensors 56 positioned immediately below the transparent window 76 in a longitudinal row illustrated in FIGS. 4, 7 and 8. Each of the light emitting diodes 58 is incorporated within a photosensor threshold circuit 78 illustrated schematically in FIG. 9. The photosensor circuit 78 includes a transistor 80 in which the light emitting diode 58 is connected to the base of the transistor 80. The output of the transistor 80 is applied to a TTL buffer amplifier 82 that is balanced by balance resistors 84 and 85. The ratio of the resistor values 84 and 85 determine the threshold for triggering the TTL buffer amplifier 82.

The light emitting diodes 58 are utilized as photosensors rather than as photoemitters. It should be clearly understood that the LED's 58 are used as photo receivers and not as photo transmitters. In this particular configuration, the light emitting diode 58 blocks the conduction of the transistor 80 until sufficient radiation is received by the photo emitting diode. Sufficient radiation will render the photo emitting diode conductive to in turn trigger the transistor 80. Light emitting diodes 58 are considerably less expensive than photo transistors or photo diodes. Light emitting diodes are approximately 5 times less expensive. This is extremely important fact when using a large number of the photo emitting diodes. For example, approximately 80 light emitting diodes (LED's) are utilized per linear foot length of measurement. In the preferred embodiment the system is has over 1,000 light emitting diodes to be able to measure boards up to 16 feet long in length with a measurement resolution of less than a quarter of an inch. Consequently, the applicant has devised an extremely unique combination of elements that are relatively inexpensive for providing high reliability and resolution of measurement.

This system is designed to scan the outputs of the light emitting diodes, mainly the TTL buffer amplifiers, to determine which light emitting diodes are covered by a board and which ones are not. In a preferred embodiment the scanning proceeds initially from those light emitting diodes closest to the cut-off saw. When the scanning system finds three light emitting diodes in a row that are receiving in normal radiation for activating their respective transistors 80, the system makes the decision that the location of the first of these is the light emitting diode that indicates the length of the board or wood piece 24.

The light gathering lens 62 is of sufficient size for focusing the light to provide sufficient radiation to activate the light emitting diode. The bezel 63 provides a barrier from receiving light reflected from an adjacent light emitting diode.

The board cut-off saw assembly 10 (FIGS. 1, 4 & 5) further includes a recommended cut indicator panel 90 that is mounted immediately above the board fence 43 for providing a visual indication or display of the recommended cut schedule to the cut-off saw operator to assist the operator in making decisions. The panel 90 includes an elongated housing 92 that extends longitudinally along side the path of the board and immediately above the board fence 43. The panel 90 includes a bank of light emitting diodes 94 that extend in a row above the board fence 43 with each light emitting diode 94 corresponding to a potential stop position that may be visually seen by the operator.

An illuminated light emitting diode 94 indicates to the operator that the associated stop represents a recommended cut so that the operator can visually tell and move the board along the fence to see if a recommended cut is possible before the operator cuts the board. Additionally the display or panel 90 may be selectively changed at any particular time to change the recommended cut schedule to the operator to vary the desired length of the wood piece as needs and orders change, without having to readjust the stops or to stop the production between each order. Thus the operator is able to make adjustments at any time which greatly increases the flexibility of the system and provides the operator with a clear image of any changes.

For example, for a particular order it may be desirable to cut wood pieces at 17 inches, 23 inches, 29 inches, 35 inches, 45 inches and 49 inches. Consequently, illuminated respective light emitting diodes 94 will indicate the location of the stops 48 for the six recommended cuts. If it was desired to add a stop or to change a stop, all that is needed to change the illumination of the light emitting diodes on the panel 90. Thus a change of the recommended cut schedule can be displayed to the operator and implemented by the operator from one board to another. This is particularly important when one order has been completed and the next order is ready to be cut. There is substantial savings in the amount of time required to change the recommended cut schedule and to have the operator implement the new schedule without building an excess inventory of undesired length board pieces from a previous cut schedule.

The board cut-off saw assembly 10 further includes an unsorted wood piece conveyor 100 (FIG. 3) associated with each cut-off saw for receiving the wood pieces 24 that have been cut by the cut-off saw 28 and for moving the pieces 24 downstream from a forward end 102 adjacent to the cut-off saw to a tail end 104. Each conveyor 100 includes a conveying surface 106 for transporting the wood pieces as illustrated in FIG. 3. For example, wood pieces 24b, 24c and 24e are illustrated being conveyed on conveying surface 106 from the forward end 102 towards the tail end 104. The unsorted wood piece conveyor 100 conveys the wood pieces past a plurality of sorting stations 108 in which the wood pieces 24 are sorted according to a prescribed criteria, generally lengths of the piece. The criteria could also include measured width. For illustration purposes, there is shown three sorting stations 108a, 108b and 108c in FIG. 3. At each of the sorting stations 108 a sorted piece conveyor 110 is provided for receiving sorted pieces from the unsorted wood piece conveyor 100 for transferring the sorted pieces for subsequent handling such as stacking. Each sorted piece conveyor 110 preferably extends transversely underneath the conveyors 100 of each of the cut-off saw lines 26 cut-off saw lines 26 in which each sorting piece conveyor 110 receives pieces having the same ranged lengths preselected by the system.

In the embodiment illustrated, piece deflectors 112 are mounted for engaging the moving wood pieces and for deflecting the pieces from their paths off the conveying surface 106 onto the appropriate sorting piece conveyors 110. Each of the path deflectors 112 includes actuators (not shown), such as pneumatic actuators, for moving the deflectors from a passive position illustrated in solid line to an active position illustrated in dotted line in FIG. 3, for deflecting the wood pieces. The specific construction of the mechanical portion of the conveyors 100 and 110 are not believed to be unique and has not been shown in any specific detail.

The system includes a waste conveyor 114 which is preferably positioned adjacent the cut-off saw 28 for receiving the waste pieces such as piece 24a, 24d and 24f as illustrated in FIG. 3 and for transporting the waste material from the cut-off saw.

The board cut-off saw assembly 10 includes a control circuit for controlling the cut-off saw operation in conjunction with the cut-off saw operator including the sorting. The control circuit includes a wood piece optical sensor 116 (FIG. 3) that is positioned adjacent the forward end 102 of the unsorted wood piece conveyor 100 for sensing the presence of a wood piece 24 at the forward end 102. Each of the sorting stations 108 includes a sorting optical sensor 118 for sensing the approach of a wood piece to its associated station 108.

As illustrated schematically in FIG. 1, the piece present optical sensor 116, the sorting optical sensors 118, the cut signal sensor 40, the light emitting diodes 58 (length sensors), the board present sensor 54 and the board length sensors 36 are operatively connected to the control circuit. The control circuit includes a cut-off saw computer or controller 120 illustrated in FIGS. 1 and 10. The cut-off saw computer 120 has a mass memory storage (RAM) 121. Each of the cut-off saw computers 120 are interconnected to a host computer 124 through a multiplexer 126. Like each of the cut-off saw computers 120, the host computer 124 has a mass memory storage 125 for storing all of the information received from the cut-off saw computers 120 and for communicating with the cut-off saw computers.

The host computer 124 includes a keyboard or other data input device 128 for enabling instructions and other data to be input to the host computer. Additionally, the host computer assembly includes a display (screen) 139 such as a CRT for displaying information requested. The keyboard 128 may be utilized to enter initial starting information instructions. For example the keyboard may be utilized to enter sorting information to assign specific lengths or a specific range of board pieces to specific sorting conveyors and for inputting the recommended cut schedule for each of the cut-off saw computers. Furthermore, the keyboard can be utilized for requesting the display or printout of current information contained in the host computer memory. A printer 140 may be connected to the host computer for printing out the information accumulated from the cut-off saw computers and the present status of the system and operation. Such information may include the screen displays depicted in Tables I–IV.

Each of the cut-off saw computers are controlled by a ROM program that is generally depicted in block flow diagrams in FIGS. 11–13. One of the cut-off saw computer programs includes a "cut signal interrupt" routine (FIG. 11). A cut signal is generated by the cut-off saw cut sensor 40 to indicate that a board is being cut. In step 144 illustrated in FIG. 1, the decision question is whether a cut interrupt signal is generated. If there is not, then the cut routine returns to the main routine. If a cut interrupt signal is generated, then the cut-off saw computer 120 instructs the wood piece measuring means 52 to measure the wood piece being cut in step 146. In decision step 148, the question is whether the measured length (data) of the previous wood piece is in a cut buffer. If the measured length of the previous piece is still in the cut buffer, that would indicate that the previous wood piece was a waste piece. And in step 150, that length data information of the previous piece is placed in a "waste" category and loaded into the output buffer for transmission to the host computer. Step 152 puts the current measured length wood piece data in the cut buffer for transmission to the host computer.

For many installation, it will not be necessary to include a width measurement system. However, in the preferred embodiment, the apparatus includes a width measuring means 96 (FIG. 1) that likewise includes a row of light emitting diodes (width sensors) for measuring the width of the board. The cut signal interrupt routine has a width option at step 154. The width measurement occurs in step 156. The measured width of the board is compared against the previous measured width to see if there is any change since the last cut. This occurs in step 158. If there has been a change since the last cut, that would indicate that a different width board is being fed to the cut-off saw.

In many cut-off saw lines, a cut-off saw is fed a specified width board and it is unnecessary to measure the width. The apparatus 10 is sufficiently versatile to be able to handle boards having different width boards. In step 160, if there is a new width, that information is placed in a "width" category and loaded into the output buffer for transmission to the host computer to enable the host computer to calculate the volume of wood being cut (board feet). In step 162 the information in the cut-off saw computer is updated with the current width. If the current width requires a different cut schedule, then the new cut schedule is sent to the cut-off saw computer for display at the indicator panel 90 for view by the cut-off saw operator. Frequently if the width of the board changes, then the cut schedule will likewise change. In step 164, the question is asked whether the board length measurement option is selected in which the length of the board is to be measured. In some situations the user may not desire to measure the length of the board. However, the apparatus 10 is sufficiently versatile to provide length measurements of the boards so that accurate calculations can be made with respect to the recovery rate of usable wood from the total processed. In step 166 the decision is made as to whether the board present flag is set. If it is set, the flag is reset in step 168. The presence of a new board is sensed by the activation of the board present sensor 34. In step 170 the board length sensors 36 are scanned to determine the length of the board. It should be noted that this only occurs when a cut interrupt signal is generated for the trim cut. For example in FIG. 2, the length of the board is determined at the time that the wood piece 24a is being cut from the board. In step 172, the board length is loaded into the output buffer for transmission to the host computer. If it is not the first cut in the board, then the routine returns from interrupt. The board present flag is utilized as a mechanism for only measuring the length of the board during the first cut and for defaulting the routine during subsequent cuts until a new board is present.

FIGS. 12A and B illustrate the cut-off saw computer sensor interrupt flow diagram that monitors the wood piece present sensor 116 and the sorting sensors 118. In step 176, the decision is made whether an interrupt signal from one of the sensors has been generated. If one of the sensor interrupt signals has been generated in step 176, then an identification is made in step 178 as to which one of the sensors generated the interrupt signal. In step 180 it is determined whether the interrupt signal was generated from wood piece present sensor 116. If the signal is from sensor 116, it indicates that the most recent cut wood piece has just been cut and now placed on the unsorted wood piece conveyor 100. In step 182 the length of the wood piece on the conveyor 100 is transmitted to the host computer and then the system returns from interrupt. If the sensor generating the interrupt signal is not the wood piece present sensor 116, then in step 184 the question is asked if it is the board present sensor 34. If it is, then in step 186 the board present flag is set indicating that a new board is present. The information that a new board is present is loaded into the output buffer in step 188 in which the information is transmitted to the host computer along with the information concerning the length of the board.

In step 190 the question is asked concerning whether the interrupt signal is from the one of the sorting sensor 118. If it is one of the sorting sensors 118, the question is asked in step 192 of whether the particular sensor has an actuator associated with the sensor. If it does, then in step 194 the question is asked whether or not the length of the measured wood piece falls within the length range for that particular sorting station. If it does fall within the specification for the particular sorting station, then in step 196 the computer commands the sorter mechanism to actuate the corresponding deflector 112 to redirect the wood piece at that particular sorting station onto the corresponding sorting piece conveyor 110. The system is designed to provide for delay between the actuation and deactivation of the deflector 112. The amount of delay may be reprogrammed. In step 198, the program is delayed for the present period. The deflector is activating to its original position in step 200.

In step 194 if the wood piece does not fall within the length range programmed for the particular sorting station at which the wood piece is located, then the program moves to step 202 and asks are there any other downstream sorting stations. If the answer is yes, then the length (data) of the wood piece is then stored in a new sort buffer associated with the next downstream station. Consequently in FIG. 3 wood piece 24e initially has its length stored in a buffer associated with the sorting piece conveyor 110a. In step 194, it will compare the measured length with the specification for conveyor 110a and will determine that it falls within the specification in which case the deflector will be activated to direct the wood piece 24e onto the sorting piece conveyor 110a. However, if the length of wood piece 24c will not fit the specification for station 108a and its length it is transferred and stored in a downstream sort buffer associated with sorting station 108b. Then in step 124 a comparison will be made to see if the length of piece 24c falls within the range for station 108b. If it does match, then the associated deflector 112 is activated to deflect wood piece 24c onto the sorting piece conveyor 110b. However, if wood piece 24b does not fit the specification for station 108b, the length data is transferred and stored in the next downstream buffer associated with the sorting station 108c. Only three sorting conveyors 110 are illustrated. The system is capable of accommodating a large number of sorting stations 108.

The length specification or length range for each of the sorting stations 108 may be changed through instructions from the host computer. Thus sorting changes may be made as desired without having to shut down the system or readjust equipment. This can be done by merely providing the necessary instructions to the host computer through the keyboard 128.

FIGS. 13A and B illustrate the cut-off saw computer main routine which is principally utilized for transmitting data and instructions between the host computer 124 and the eight cut-off saw computers 120. After initialization, step 210 asks the question of whether there is a width option. If the width option has been input into the host computer, then in step 212, the width measuring means 96 is activated to measure any board that is at the cut-off saw station. After measuring the width of the board, the information is updated and transmitted to the host computer in step 216.

In decision step 218 it is determined whether there is any information in the output buffer to be sent to the host computer. If there is, the information is transmitted to the host computer from the output buffer in step 220.

In step 222, it is determined whether there is any information (instructions) in the input buffer from the host computer. In step 224, the information is obtained and decoded. In decision step 224 it is determined whether the information is a new cutting size schedule. If the host computer has sent to the cut-off saw computer a new cutting size schedule, the new schedule is stored in the length cutting schedule memory of the cut-off saw computer in step 228. The recommended cut indicator panel 90 is activated in step 230 to display the new cutting schedule to the operator. Consequently, a new cutting schedule can be rapidly implemented without any disruption in the production and may be implemented from one board to another to provide a great deal of versatility and to enable companies to very efficiently handle rather small orders.

If the instruction is not a new cutting schedule, step 228 determines if the instruction is a cut size deletion instruction. If it is a deletion instruction, then in step 234 the particular cut size is removed from the cutting schedule. In step 236, the recommended cut indicator panel 90 is activated to remove or turn off the respective light emitting diodes that represents the cut size that has been deleted.

In step 238 it is determined whether the instruction is a sorting change instruction. If it is a sorting change instruction, then in step 240 is to determine whether it is an instruction to change the sorting station for a particular size or length wood piece. If it is, then in step 242 the change is made. If it is not a sorting change instruction, then in step 244 it is determined whether it is an instruction to change the length specification for a sorting station. If it is, then the information is stored accordingly in step 246. Consequently, in steps 226–246, sorting change instructions may be easily accommodated to provide a wide variety of control of not only what size boards are sorted at each particular sorting station but to enable the range or size to be changed accordingly in a very rapid manner providing for a great deal of versatility. For example, if one particular sorting station or conveyor is overloaded, changes can be made to have the same size board sorted on two different sorting conveyors 110 at different cut-off saw lines.

The information obtained by the cut-off saw computer and communicated to the host computer is assembled to provide very valuable information for use by the cut-off saw operators, the supervisors of the operators and for management. Tables I-IV are provided to give examples of screen displays on the display 139 for displaying the accumulating information and calculations that may be useful for efficient operation.

TABLE I

| | TITLE: FOOTAGE TALLY BY CUT-OFF SAW | | | | |
|---|---|---|---|---|---|
| STATION NO. | CUT-OFF SAW OPERATOR | TARGET FOOTAGE | FOOTAGE CUT | WASTE | PERCENTAGE OF TOTAL |
| 1 | ABC | 7833 | 7257 | 879 | 9.6 |
| 2 | DEF | 7833 | 7478 | 975 | 10.2 |
| 3 | GHI | 7833 | 6474 | 893 | 9.4 |
| 4 | JKL | 7833 | 6428 | 822 | 9.5 |
| 5 | MNO | 7833 | 4836 | 777 | 12.2 |
| 6 | PQR | 7833 | 6626 | 1532 | 17.2 |
| 7 | STU | 7833 | 5010 | 1126 | 16.6 |
| 8 | VWX | 7833 | 3695 | 1011 | 20.9 |
| Totals | | | 47803 | 8014 | 12.6 |

Table I is entitled "Footage Tally by Cut-off Saw" in which the amount of footage (board foot) that has been cut at each cut-off saw station is shown on a real time basis. Column 1, is a listing of the cut-off saw stations. Column 2 indicates the personal name of the cut-off saw operator associated with each cut-off saw station. Column 3 indicates the target footage desired to be cut during a particular time period (shift). This is generally a goal that is set for each operator for a work shift. Column 4 entitled "Footage Cut" represents the amount of footage or board feet that has been cut on a real time basis so the cut-off saw operator can visually see his or her performances. Such information is also helpful in training and the determining efficiency of the training and the capability of the operators in reaching the desired goals. The fifth column entitled "Waste" is a column that indicates the amount of waste that has been cut from the boards. Various other categories other than "Waste" may be depicted in column five such as "finger joint stock"; "short cut stock"; or "long cut stock." A particular category request such as "Waste" may be input through the computer so that management or the supervisor can determined how much of a particular category of product has been produced. The last column entitled: "Percentage of Total" is a percentage of the category of wood product specified in column five divided by the total amount of total wood cut by the cut saws. The total is determined by measuring the length of the boards. The columns entitled "Target" and "Footage Cut" represents measurements made of the lengths of the wood pieces. The category "Waste" is determined by subtracting the board length by the amount of usable wood material (wood pieces) that has been cut.

TABLE II

| | Cut-off saw Measuring System 13:47 11/20/87 Cutsize Display | | | | | | | |
|---|---|---|---|---|---|---|---|---|
| Length | 1 | 2 | 3 | 4 | 5 | 6 | 7 | 8 |
| 0.00 | 0 | 0 | 0 | 0 | 0 | 1 | 0 | 0 |
| 6.70 | 0 | 0 | 1 | 0 | 0 | 0 | 0 | 0 |
| 7.00 | 383 | 0 | 115 | 46 | 142 | 95 | 150 | 0 |
| 7.15 | 49 | 120 | 495 | 172 | 3 | 0 | 0 | 28 |
| 7.30 | 1 | 483 | 0 | 90 | 0 | 0 | 0 | 0 |
| 13.30 | 0 | 0 | 1 | 1 | 9 | 280 | 3 | 0 |
| 13.45 | 186 | 1 | 53 | 0 | 170 | 29 | 117 | 0 |
| 13.60 | 164 | 211 | 299 | 147 | 14 | 0 | 22 | 13 |
| 13.75 | 1 | 160 | 0 | 105 | 0 | 0 | 0 | 12 |
| 13.90 | 0 | 0 | 0 | 18 | 4 | 0 | 0 | 4 |
| 15.85 | 177 | 0 | 3 | 3 | 1 | 22 | 51 | 0 |
| 16.00 | 0 | 0 | 54 | 137 | 40 | 195 | 25 | 29 |
| 16.15 | 370 | 133 | 155 | 5 | 90 | 31 | 0 | 1 |
| 16.30 | 1 | 118 | 1 | 2 | 8 | 1 | 36 | 0 |
| 18.85 | 0 | 0 | 2 | 0 | 8 | 0 | 1 | 0 |
| 19.00 | 0 | 0 | 0 | 0 | 85 | 61 | 65 | 78 |

Table II illustrates a cut size display in which the sizes of the wood pieces are listed in column 1 whereas the cut-off saw stations are listed in the top row from 1-8. The sizes go from 0 to 19.0 inches. The information displayed shows the number of wood pieces of each particular length cut at each of the cut-off saw stations. The information displayed in Table II is particularly useful in determining over a period of time the quality of judgments being made by the operators and the quality of raw material that is being cut. If the quality of the raw material being cut is markedly different between one supplier and the other, then this information may be useful to management in their purchasing practices. Furthermore it may be helpful in assisting the training of the cut-off saw operators to obtain the best cut of material. It is also helpful in determining and evaluating the operators judgment in cutting the recommended sizes. Furthermore the information is helpful in evaluating the performance of the total operation.

TABLE III

| | | Inventory 12:00 01/01/88 | | | |
|---|---|---|---|---|---|
| Part No. | Description | Onhand | Onorder | Needed | Today |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |
| xxxxxxx | xxxxxxxxxxxxxxx | xxxxxxx | xxxxxxx | xxxxxxx | xxxxxxx |

Table III is entitled "Inventory" and is quite important in providing an almost real time update of the inventory and the part number distribution. In the first column referred to as "Part No." could also be size. Part No. may include the same length items but ones of different widths and different thicknesses. Usually a different part number is given to each different product. The description column describes the product. The third column includes the number of each of the part numbers that are on hand. In one particular operation the onhand column identifies all the part numbers that have been graded and stacked and posted. The next column entitled "Onorder" would be a summation of all unfilled orders that are presently on hand. The next column entitled "Needed" would be the difference between the amount ordered and that on hand to indicate the number of items of each part number that is needed. The last column titled "Today" may include the unposted cut wood pieces that have been cut during the shift but had not been posted or included in column 3. In some operations the present shift information may not be included in the posted "Onhand" part numbers. In a particular operation it may be desirable to accumulate the present production under the separate column titled "Today" and then at the end of the day to add that to the "Onhand" information in column 3.

TABLE IV

| Cutting Schedule 12:00 01/01/88 | | | | | |
|---|---|---|---|---|---|
| Part No. | Description | Onorder | Shipped | Onhand | Needed |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |
| xxxxxxx | xxxxxxxxxxxxxx | xxxxxxx | xxxxxxx | xxxxxxx | xxxxxxx |

Table IV is entitled "Cutting Schedule" and is a printout of a cutting schedule that describes the part number, the description, the number of parts on order, the number that have been shipped, the number on hand, and the number needed. Consequently when the numbers in column "Needed" approaches zero, then a new cutting schedule may be implemented. New instructions are sent to each of the cut-off saw computers and displayed on the recommended cut indicator panels 90 at each of the cut-off saw stations.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A manual board cut-off saw assembly for enabling a cut-off saw operator to cross cut a plurality of elongated boards at desired locations along their length and to remove defective sections from the boards based upon the observation of the operator as to the location of the defective sections, comprising:
    a manually operated cut-off saw for enabling the operator to cross cut the elongated boards intermediate board ends to subdivide the boards into selected length wood pieces and to remove defective sections from the elongated boards;
    means for supporting the elongated boards upstream of the cut-off saw as the elongated boards are being cut;
    a plurality of longitudinally spaced selectable mechanical board stops downstream of the cut-off saw for enabling the operator to manually place an end of the board against a selected stop preparatory to cutting a wood piece from the board;
    independent measuring means extending downstream of the cut-off saw and separate from the mechanical board stops for measuring the length of each wood piece as the piece is being cross cut from the elongated board having its end placed against a selected stop and in response thereto generating an electrical signal representative of an accurate measurement of the length of each wood piece;
    sorting means responsive to the measured length of each wood piece for sorting the wood pieces according to their lengths; and
    wood accumulation processing means responsive to the electrical signals for storing information in real time concerning the number of pieces of each length cut from the plurality of boards.

2. The board cut-off saw apparatus as defined in claim 1 further comprising:
    means separate from the mechanical board stops for measuring the lengths of the elongated boards and in response thereto generating an electrical signal representative of the length of the elongated boards, and
    comparison means responsive to the electrical signals representing the measured lengths of the elongated boards and the electrical signals representing the measured length of the wood pieces for determining the net recovery rate of the amount of wood represented by the length of the wood pieces in comparison to the amount of wood represented by the length of the elongated boards;
    net recovery processing means for storing the net recovery rate information and updating the net recovery rate information as each elongated board is cut into the wood pieces.

3. The wood cut-off saw assembly as defined in claim 1 wherein the independent measuring means for measuring the length of the wood pieces includes;
    a light generating means downstream of the cut-off saw for projecting beams of light transverse to the major dimension of the board as it is being sawn;
    a light detector having photo sensors positioned at selected intervals downstream of the cut-off saw parallel to the major dimension of the board as it is being sawn for normally receiving the beams of light when the board is absent and for generating an electrical signal when the board interrupts the beam in which the electrical signal is indicative of the length of the wood piece being cut from the board.

4. The board cut-off saw assembly as defined in claim 3 wherein the photosensors are comprised of a series of adjacent light emitting diodes in which the center-to-center distance between adjacent light emitting diodes is less than one-quarter inch to provide a measuring resolution of less than one-quarter of an inch.

5. The board cut-off saw as defined in claim 4 wherein the series of light emitting diodes are mounted adjacent to each other on a printed circuit board.

6. The board cut-off saw as defined in claim 4 wherein each light emitting diode has a threshold circuit connected thereto for generating the signal when the light intensity from the light source received by the corresponding light emitting diode falls below a threshold level.

7. The board cut-off saw assembly as defined in claim 6 wherein the series of light emitting diodes and the corresponding threshold circuits are mounted on a printed circuit board that extends parallel with the length of the elongated board as it is being cut downstream of the cut-off saw.

8. The board cut-off saw assembly as defined in claim 1 further comprising a cut-off saw sensor means which is activated when the elongated board is being cut; and
wherein the independent measuring means is responsive to the activation of the cut-off saw sensing means for measuring the length of each wood piece as the elongated board is being cut.

9. The board cut-off saw apparatus as defined in claim 1 further comprising:
a clock for determining elapsed time, and
production efficiency means responsive to the clock and the measured length of each wood piece for determining the amount of wood cross cut with respect to elapsed time.

10. The board cut-off saw apparatus as defined in claim 1 further comprising:
independent width measuring means separate from the mechanical board stops for measuring the width of the elongated boards as the elongated boards are being cross cut and in response thereto generating an electrical signal representative of the width of the elongated boards.

11. The board cut-off apparatus as defined in claim 1 further comprising a recommended cut visual indicator means extending downstream of the cut-off saw associated with the plurality of board stops for providing a visual indication at selected downstream distances from the cut-off saw at which recommended cuts are desired.

12. The board cut-off saw apparatus as defined in claim 11 further comprising:
visual indicator control means for controlling the recommended cross cut visual indicator means;
keyboard means operatively connected to the visual indicator means for changing the visual indication.

13. A manual board cut-off saw assembly for cross cutting a plurality of elongated boards at desired locations along their length and to remove defects from the boards, comprising:
a plurality of manually actuated cut-off saws for receiving the elongated boards and for enabling a cut-off saw operator to cross cut the elongated boards intermediate board lengths to subdivide the boards into selected length wood pieces and to remove defects from the boards;
feed means for feeding the boards lengthwise to an upstream side of the cut-off saws;
a plurality of longitudinally spaced selectable mechanical stops downstream of each cut-off saw for enabling the operator to manually place an end of the board against a selected stop preparatory to cutting a wood piece from the board;
independent length measuring means separate from the mechanical stops extending to a downstream side of each of the cut-off saws for measuring the lengths of the wood pieces as the pieces are being cut from the boards and in response thereto generating electrical signals representative of accurate measurements of the lengths of the wood pieces;
sorting means associated with each of the cut-off saws and responsive to the measured lengths of the wood pieces for sorting the wood pieces according to their lengths;
piece accumulation means responsive to the electrical signals responsive to the measured length of each wood piece for storing accumulated data in real time concerning the number of wood pieces of each selected length cross cut from the plurality of boards cut by the plurality of cut-off saws.

14. The board cut-off saw assembly as defined in claim 13 further comprising:
cut-off saw sensing means associated with each corresponding cut-off saw that is activated each time a board is cross cut;
wherein the independent length measuring means is responsive to the activation of the cut-off saw sensing means for measuring the length of the wood pieces as the wood pieces are being cross cut from the boards.

15. The board cut-off saw apparatus as defined in claim 13 further comprising:
control means responsive to the measured length of the wood pieces for controlling the sorting means to sort the wood pieces into categories relating to the length of the wood pieces.

16. The board cut-off saw apparatus as defined in claim 13 wherein the sorting means includes unsorted piece conveyors extending from the cut-off saw for receiving the unsorted wood pieces from the cut-off saws and for conveying the unsorted wood pieces in selected paths away from the cut-off saws;
sorted piece conveyors spaced along the unsorted piece conveyors for receiving sorted wood pieces;
activating means along the unsorted piece conveyors;
wherein the control means is operatively connected to the actuating means for selectively activating the actuating means to divert the wood pieces from the unsorted piece conveyors to the sorted piece conveyors in response to the measured length of the wood pieces.

17. The board cut-off saw apparatus as defined in claim 16, wherein the control means includes:
memory means for storing the length of the wood pieces and for storing the sorted piece conveyors associated with each length of the wood piece and
keyboard means for designating a range of length of board pieces associated with each sorted piece conveyor and for changing such selected range for each sorted piece conveyor.

18. The board cut-off saw apparatus as defined in claim 13 further comprising:
cut-off saw process monitoring means responsive to the measured length of each wood piece for monitoring and calculating the amount of wood cross cut by each cut-off saw;
display means operatively connected to the cut-off saw monitoring process means for visually displaying the total amount of wood cross cut and the number of selected length wood pieces produced by each cut-off saw.

19. The board cut-off saw apparatus as defined in claim 18, wherein the cut-off saw monitoring means compares the amount of wood represented by the wood pieces and selected volume goals with respect to time.

20. The board cut-off saw apparatus as defined in claim 18 wherein the display means is operatively connected to the cut-off saw monitoring means for visually displaying the total amount of wood cross cut at each cut-off saw and the selected volume goal for each cut-off saw and the degree of goal completion with respect to time.

* * * * *